United States Patent [19]

Katchman et al.

[11] 3,761,541

[45] Sept. 25, 1973

[54] STABILIZED POLYPHENYLENE ETHERS

[75] Inventors: Arthur Katchman, Delmar, N.Y.;
Robert M. Summers, Arlington, Mass.

[73] Assignee: General Electric Company, Pittsfield, Mass.

[22] Filed: Oct. 12, 1971

[21] Appl. No.: 188,424

Related U.S. Application Data

[63] Continuation-in-part of Ser. No. 01,542, Jan. 8, 1970, abandoned.

[52] U.S. Cl......... 260/874, 260/45.7 R, 260/45.7 S, 260/45.7 P, 260/45.75 R, 260/45.75 N, 260/45.75 K, 260/45.9 R, 260/876 R, 260/897 R, 252/401
[51] Int. Cl... C08g 51/56, C08g 51/58, C08g 51/60
[58] Field of Search.................. 260/874, 45.9, 876, 260/45.7 R, 45.7 P, 45.75 R, 45.7 S

[56] References Cited
UNITED STATES PATENTS

| | | | |
|---|---|---|---|
| 3,352,820 | 11/1967 | Brawn............................. | 260/876 R |
| 3,453,231 | 7/1969 | Bussink et al...................... | 260/874 |
| 3,563,934 | 2/1971 | Burnett.......................... | 260/45.9 R |

*Primary Examiner*—John C. Bleutge
*Assistant Examiner*—J. Zeegler
*Attorney*—William F. Mufatti

[57] ABSTRACT

A stabilized polyphenylene ether composition consisting of a major portion of a polyphenylene ether or a blend of a polyphenylene ether and a second resinous component and a minor portion of a stabilizer combination comprising an alkanolamine alone or in combination with an inorganic sulfide, an organic phosphite and mixtures thereof.

A preferred composition comprises a blend of a poly(2,6-dialkyl-1,4-phenylene)ether and a polystyrene stabilized with a mixture of the alkanolamine, organic phosphite and inorganic sulfide as the combination of stabilizers appears to provide a synergism resulting in substantially increased resistance to oxygen containing atmospheres. Oxides of metals such as zinc may be added to the compositions which contain inorganic sulfides to provide additional stability.

28 Claims, No Drawings

STABILIZED POLYPHENYLENE ETHERS

CROSS-REFERENCE TO RELATED APPLICATIONS

This application is a continuation-in-part of application U.S. Ser. No. 1,542, filed Jan. 8, 1970 (now abandoned).

This invention relates to the polyphenylene ethers and more particularly, to polyphenylene ethers stabilized with a stabilizer combination containing an alkanolamine.

BACKGROUND OF THE INVENTION

The polyphenylene ethers are known and described in numerous publications including U.S. Pat. Nos. 3,306,874 and 3,306,875 of Allan S. Hay and U.S. Pat. Nos. 3,257,357 and 3,257,358 of Gelu Stoeff Stamatoff, all incorporated herein by reference. The high molecular weight polyphenylene ethers are high performance engineering thermoplastics possessing relatively high melt viscosities and softening points; i.e., in excess of 250°C., and are useful for many commercial applications requiring high temperature resistance including formation of film, fiber and molded articles.

It is known that the polyphenylene ethers, and particularly the 2,6-dialkyl substituted polyphenylene ethers, are somewhat unstable under the influence of heat and light exposure causing the resin to become dark colored, brittle and undesirable for many uses. The cause of the degradation is not fully understood, but is believed to be due, in part, to the presence of hydroxy groups on the polymer chain, a sensitivity to oxygen-containing atmospheres and the degradative effects of traces of impurities present in the polymer chain.

Heretofore, a large number of different compounds such as the phenolic antioxidants exemplified by p-phenyl phenol, N-steroyl-p-aminophenol and 2,2'-methylene bis(4-ethyl-6-tertiary butylphenol) have been used as heat and light stabilizers for the polyphenylene ether compositions. These stabilizers were generally unsatisfactory for even short exposure to oxygen-containing atmospheres such as air at elevated temperatures.

Other stabilizers have been found for the polyphenylene ethers that provide a substantial improvement in resistance of the polymer to the degradative effects of oxygen. For example, in U.S. Pat. No. 3,388,085, there is disclosed a polyphenylene ether composition stabilized with from about 0.1 to 2.0 percent of a 2-mercaptobenzimidazole. In U.S. patent application Ser. No. 728,914, now U.S. Pat. No. 3,639,334 there is disclosed the stabilization of polyphenylene ethers with either an organic phosphite or a hydrazine. Further, U.S. Pat. No. 3,420,792 discloses a stabilized polyphenylene ether consisting of a major portion of a polyphenylene ether and a minor portion of a hexalkylphosphoric triamide stabilizer. Other effective stabilizers for the polyphenylene ethers include ketenes, various boron compounds, such as boron oxides, various salts of napthenic acid and the like. Though these stabilizers provide effective stabilization of the polyphenylene ethers, new and more effective stabilizer systems are continuously sought.

DESCRIPTION OF THE INVENTION

According to this invention there are provided stabilized compositions comprising a major portion of a polyphenylene ether and a minor proportion of a stabilizer combination comprising an alkanolamine alone or in combination with an organic phosphite, an inorganic suflide and mixtures thereof. Metal oxides may be optionally added to compositions containing inorganic sulfides to provide additional stability under adverse conditions. A preferred composition comprises the poly(2,6-dialkyl-1,4-phenylene)ether, a polystyrene blended with the polyphenylene ether and a stabilizing combination comprising the alkanolamine, the inorganic sulfide, and the organic phosphite. It has been found that the combination of the sulfide and phosphite with the alkanolamine provides a synergism resulting in a substantial increase in the resistance of the polymer to the degradative effects of oxygen-containing atmospheres at elevated temperatures.

The polyphenylene ethers contemplated by the subject invention, in a preferred embodiment, have repeating structural units of the formula

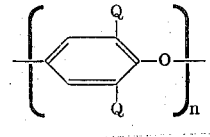

where the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. Examples of polyphenylene ethers corresponding to the above formula can be found in the above-referenced patents of Hay and Stamatoff. The preferred polyphenylene ethers for purposes of the present invention are those having alkyl substitution in the two positions ortho to the oxygen ether atom — i.e., where each Q is alkyl, most preferably, having from 1 to 4 carbon atoms. The most preferred polyphenylene ether for purposes of the present invention is poly(2,6-dimethyl-1,4-phenylene)ether.

The term polyphenylene ether, as used in this disclosure, is intended to include within its scope those polymers represented by the above formula as well as polyphenylene ethers having properties altered by admixture with other resins. One such polyphenylene ether mixture is disclosed in U.S. Pat. No. 3,379,792 incorporated herein by reference wherein the flow properties of the polyphenylene ethers are improved by blending with from about 0.1 to 25 parts by weight of a polyamide. In U.S. Pat. No. 3,361,851, there is disclosed a polyphenylene ether composition comprising a polyphenylene ether blended with a polyolefin. The polyolefin is added to the blend to improve impact strength and resistance to aggressive solvents. In the U.S. Pat. No. 3,383,435, there is provided means for simultaneously improving the melt processability of the polyphenylene ethers while simultaneously upgrading many properties of polystyrene. The invention of this patent is based upon the discovery that the polyphenylene ethers and the polystyrenes, including the modified polystyrenes, are combinable in all proportions resulting in blends having many properties improved over those of either of the components. As disclosed in said patent, the polystyrenes combinable with the polyphenylene ether are those having at least 25 percent by weight polymer units derived from a monomer having the formula

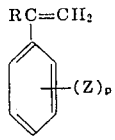

where R is hydrogen, (lower)alkyl or halogen; Z is a member selected from the class consisting of vinyl, hydrogen, halogen and (lower)alkyl; and p is 0 or a whole number equal to from 1 to 5. The preferred composition of this patent is a poly(2,6-dialkyl-1,4-phenylene)ether combined with polystyrene or rubber-modified polystyrene. "(Lower)alkyl" includes 1-6 carbon atoms.

The alkanolamine contemplated by the subject invention may be represented by the formula $NR_3$ where each R is independently hydrogen or (lower)alkanol having from 1 to 4 carbon atoms, provided that at least two Rs are alkanol. Typical alkanolamines include, by way of example, diethanolamine, triethanolamine, tripropanolamine, dibutanolamine and the like. The amount of alkanolamine is not critical and is added in an amount capable of providing adequate stabilization. In general, the alkanolamine may constitute from about 0.1 to 6.0 percent by weight of the total formulation.

The particular inorganic sulfide that may be used in combination with the alkanolamine is not critical, representative examples of suitable sulfides including sodium sulfide, potassium sulfide, calcium sulfide, barium sulfide, zirconium sulfide, titanium sulfide, nickel sulfide, manganese sulfide, iron sulfide, cobalt sulfide, chromium sulfide, copper sulfide, zinc sulfide, cadmium sulfide, mercurous and mercuric sulfides, tin sulfide, lead sulfide, and the like. Most preferred sulfides are those of zinc and cadmium. The amount of sulfide added to the polyphenylene ether formulation is not critical, small amounts providing some improvement and larger amounts providing greater improvement. Preferably, the sulfide in the formulation comprises at least 0.1 percent by weight and most preferably, from 0.1 to 6.0 percent by weight of the total formulation.

In addition to the alkanolamine and inorganic sulfide, an organic phosphite may be included in the stabilizer formulation. Phosphites contemplated by the invention include those compounds of the formula:

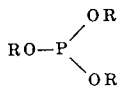

wherein R is independently selected from the group consisting of hydrogen and substituted and unsubstituted hydrocarbon groups containing up to about 20 carbon atoms including saturated and unsaturated, straight, branched chain and mono-cyclic and polycyclic groups. Suitable examples of these compounds are those wherein R is hydrogen, straight or branched chain alkyl of from 1–20 carbon atoms, alkenyl of from 1–20 carbon atoms, (lower)-alkylphenyl, phenyl, halo alkyl of from 1–20 carbon atoms, and substituted phenyl wherein the substituents may include one or more halogen, hydroxy or (lower)alkyl groups. Suitable examples include the following: phenylneopentyl phosphite, phenylethylene hydrogen phosphite, triethylene phosphite, dichloroethyl phosphite, tributyl phosphite, trilauryl phosphite, bis(2-ethylhexyl) hydrogen phosphite, phenyl bis(3,5,5'-trimethylhexyl)phosphite, mixed 2-ethylhexyloctyl phenyl phosphite, cis-9-octadecenyl diphenyl phosphite, 2-ethyl-hexyl di(p-tolyl)phosphite, allyl phenyl hydrogen phosphite, bis(2-ethylhexyl)p-tolyl phosphite, triadecyl phosphite, bis(2-ethylhexyl)phenyl phosphite, triallyl phosphite, triisooctyl phosphorotrithioite, tributyl phosphorotrithioite, trimethallyl phosphite, tri(nonylphenyl)-phosphite, phenyl methyl hydrogen phosphite, bis(p-tert-butyl phenyl)octadecyl phosphite, triamyl phosphite, (p-tert-butylphenyl)di(octadecyl)phosphite, diisopropyl hydrogen phosphite, p-cymyl dioctyl phosphite, dipropyl hydrogen phosphite, di(dodecyl)p-tolyl phosphite, triisooctyl phosphite, decyl bis(p-1,1,3,3-tetramethylbutylphenyl) phosphite, trimethyl phosphite, nonyl bis(p-1,1,3,3-tetramethylbutylphenyl)-phosphite, diallyl hydrogen phosphite, diisodecyl p-tolyl phosphite, tricresyl phosphite, diisodecyl phenyl phosphite, triphenyl phosphite, octyl bis(3,5,5-trimethylhexyl) phosphite, dibutyl phenyl phosphite, di-p-tolyl 3,4,5-trimethylhexyl phosphite, 2-chloroethyl diphenyl phosphite, p-tolyl bis-(2,5,5-trimethylhexyl)-phosphite, diphenyl decyl phosphite, 2-ethylhexyl diphenyl phosphite, tris(2-ethylhexyl)phosphite, tri(octadecyl)phosphite, trioctyl phosphite, tris(2-chloroisopropyl) phosphite, dibutyl hydrogen phosphite, di(dodecyl) hydrogen phosphite, phenyl dodecyl phosphite, di(tridecyl hydrogen phosphite, and diphenyl hydrogen phosphite. The permissible concentration range for the phosphite is about the same as that for the sulfide and alkanolamine, but where the three are used in combination, the lower limits of the range are preferred such as for example, between about 0.1 to 2.0 percent for each of the stabilizers in the combination.

Under aqueous acidic conditions the sulfide stabilized compositions of the invention may produce by-products as a result of decomposition. We have found that this may be controlled by the use of a metal oxide such as zinc oxide, magnesium oxide, cadmium oxide, barium oxide, calcium oxide, titanium dioxide, zirconium oxide, mercuric oxide and lead oxide. Generally the amount of oxide employed in the formulation will preferably comprise about 0.1–1.0 percent by weight although the suitable range is about 0.05 percent to about 6 percent.

The manner of adding the stabilizer to the polyphenylene ether is not critical to the invention. Hence, any method can be employed. For example, the stabilizer can be blended with a resin powder in a blender such as a Waring blender. Alternatively, the resin can be dissolved in suitable solvent and the solvent added to the solution. The stabilized polymer may then be recovered from solution. An additional method comprises preparing a premix of the components of the resinuous composition, extruding the premix and chopping the extruded strands into pellets.

The stabilized compositions of this invention are useful for all purposes for which the polyphenylene ethers have hitherto been used, for example, for conversion to films, fibers, molded articles and the like, by conventional methods.

The stabilized compositions may also contain dyes, pigments, filler, reinforcing fibers, flame retardants, plasticizers and the like.

DESCRIPTION OF THE PREFERRED EMBODIMENTS

The following examples serve to illustrate the invention further.

EXAMPLES 1 – 8

A blend was prepared comprising 45 parts of a poly(-2,6-dimethyl-1,4-phenylene)ether (identified as PPO polyphenylene ether and available from the General Electric Company), 55 parts of a high impact polystyrene (identified as Lustrex HT–91 available from Monsanto Chemical Company and believed to contain about 9% butadiene), 1.5 parts polyethylene, and various quantities of cadmium sulfide and diethanolamine.

Test specimens were prepared by passing approximately 25 pounds of the powder blend through a Reifenhauser S 60 vented extruder to form an extruded strand which was chopped into pellets. One gram samples of these pellets were heated in a pure oxygen atmosphere at 125°C. and the time necessary for uptake of 5 cubic centimeters of oxygen per gram of polymer blend (ccm/gm) determined. The amount of cadmium sulfide and triethanolamine used and the results obtained are set forth in the following table:

| example number | triethanolamine[1] content (pbw) | Cadmium Sulfide[1] content (pbw) | Oxygen uptake time (hrs. at 125°C.) |
|---|---|---|---|
| 1 | 0.02 | 0.02 | 195 |
| 2 | 0.03 | 0.03 | 210 |
| 3 | 0.10 | 0.10 | 230 |
| 4 | 0.15 | 0.15 | 260 |
| 5 | 0.30 | 0.30 | 250 |
| 6 | 1.50 | 1.50 | 200 |
| 7 | 0 | 0.60 | 60 |
| 8 | 0.50 | 0 | 50 |
| Control | 0 | 0 | 25 |

(1) pbw--parts per 100 parts of resin.

From the above table, it can be seen that significant improvement in resistance to oxygen uptake is realized by even small additions of triethanolamine, but combining the triethanolamine with cadmium sulfide provides substantial improvement that is greater than a merely additive effect.

EXAMPLES 9 – 14

The blending and extrusion procedures of Examples 1 to 8 are repeated with a 50—50 blend of a poly(2,6-dimethyl-1,4-phenylene) ether and a high impact polystyrene with various mixed stabilizers. The resultant pellets were molded into tensile specimens and thermal aging was carried out by placing these specimens in an air circulating oven maintained at 125°C. Samples were considered brittle when they broke without yielding. Stabilizer formulations and results are set forth in the following table:

| example number | additive (pbw) | time to embrittle at 120°C. (days) |
|---|---|---|
| 9 | ZnS (0.50) | 7 |
| 10 | TEOA (0.50) | 8 |
| 11 | TEOA (0.25) ZnS (0.25) | 15 |
| 12 | TDP (0.25) ZnS (0.25) | 14 |
| 13 | TDP (0.25) TEOA (0.25) ZnS (0.25) | 34 |
| 14 | TDP (0.50) TEOA (0.50) ZnS (0.50) | 36 |

TEOA - triethanolamine
TDP - tridecylphosphite

From the above table, it can be seen that there is a synergism in the combination of the sulfide with the triethanolamine and there is an even greater synergism exhibited by the further combination with the phosphite.

EXAMPLE 15

The procedure of Examples 9 to 14 can be repeated substituting any of the following phosphites for tridecylphosphite:
phenyldodecylphosphite
phenylethylenehydrogen phosphite
cis-9-octadecenyl diphenyl phosphite
triamyl phosphite
diisododecyl-p-tolyl phosphite
dibutylphenyl phosphite.

EXAMPLES 16 – 24

Blends were prepared consisting of 50 parts poly-(2,6-dimethyl-1,4-phenylene) ether, 50 parts high impact polystyrene, 3.0 parts triphenylphosphate, 1.5 parts polyethylene and various mixed stabilizers. These blends were then extruded on an unvented ¾ inch Wayne laboratory extruder at 500°–620°F. The resulting strand was pelletized and the pellets molded into test pieces on a 3 oz. screw injection molder at a stock temperature of 500°F. and a mold temperature of 170°F. Films were made by pressing pellets between heated platens (500°F.) in a hydraulic press, using a cycle of 1 minute preheat without pressure followed by 1 minute under 10,000 pounds ram pressure.

Thermal aging was performed on molded tensile bars by placing these bars in an air circulating oven at 125°C., periodically removing samples, cooling to room temperature and breaking them under tension in an Instron machine. Samples were considered brittle when they broke without yielding.

Oxygen absorption measurements were made in pure oxygen at 110°C. A one gram film was placed in a glass test tube containing molecular sieves as absorbants for water and carbon dioxide. The test tube and contents were then placed in a constant temperature bath, flushed with pure oxygen and then connected to a gas measuring buret also containing pure oxygen. The time required for a 5 and 1 cc oxygen uptake was determined.

The formulations prepared and the results obtained are set forth in the following table:

| sample number | stabilizers (phr) | time required (days) for embrittlement in Air at 120°C. | hours to reach 5 ml O₂/g (at 110°C.) | 10 ml O₂/g (at 110°C.) |
|---|---|---|---|---|
| 16 | None | 2 | 3 | 24 |
| 17 | TDP (1.0) | 3 | | |
| 18 | TEOA (.15) | 3 | 50 | 115 |
| 19 | TEOA (.5) | 6 | | |
| 20 | TEOA (.25) | 5 | | |
| 21 | TDP (1.0); TEOA (.15) | 19 | | |
| 22 | TDP (1.0); TEOA (.25) | 10 | | |
| 23 | TDP (1.0); ZnS (.25) | | | |
| 24 | TDP (1.0); ZnS (.15) TEOA (.25 ) | 30 | 210 | 420 |

TDP tridecylphosphite
TEOA triethanolamine
ZnS zinc sulfide

EXAMPLES 25 – 32

Blends consisting of 40 parts poly(2,6-dimethyl-1,4-phenylene) ether, 60 parts high impact polystyrene, 1.5 parts polyethylene, 9.0 parts triphenylphosphate and various amounts of stabilizers were prepared as described in Examples 16 – 24. Molded bars aged at 115°C. in an air circulating oven and the time required for the samples to become brittle was determined. Formulations and results are set forth in the following table:

| sample no. | stabilizer | time required (days) for embrittlement at 115°C. |
|---|---|---|
| 25 | None | 9 |
| 26 | ZnS (.15) | 9 |
| 27 | DEOA (.10) | 9 |
| 28 | TEOA (.10) | 9 |
| 29 | ZnS (.15); DEOA (.10) | 15 |
| 30 | ZnS (.15); TEOA (.10) | 22 |
| 31 | ZnS (.15); DEOA (.10) TDP (1) | 24 |
| 32 | ZnS (.15); TEOA (.10) TDP (1) | 32 |

ZnS : Zinc sulfide
DEOA: Diethanolamine
TEOA: Triethanolamine
TDP : Tridecylphosphite

EXAMPLES 33 – 36

Blends consisting of 45 parts poly(2,6-dimethyl-1,4-phenylene) ether, 55 parts high impact polystyrene, 1.5 parts polyethylene and small amounts of triethanolamine, tridecylphosphite and zinc sulfide were prepared, extruded and molded as described in Examples 16 to 24. Bars were aged at 125°C. The time required for embrittlement was determined as previously described. Formulations and results are set forth in the following table:

| sample number | stabilizer added (phr) | time (days) to embrittlement at 125°C. |
|---|---|---|
| 33 | None | 2 |
| 34 | TEOA (1) | 9 |
| 35 | TEOA (1); TDP (1) | 14 |
| 36 | ZnS (.15); TDP (1) | 13 |

TEOA - triethanolamine
ZnS - zinc sulfide
TDP - tridecylphosphite

It is known that sulfur-containing stabilizers have not met with great success for the polyphenylene ethers. The reason for this is that in an extrusion or molding operation, at the elevated temperatures required for the polyphenylene ethers the sulfur-containing stabilizers tend to decompose and liberate by-product vapors that are harmful to equipment and which may create a health hazard. However, it is an unexpected result of the subject invention that the stabilizing combinations containing sulfides do not appear to decompose upon molding and no by-product vapors are detectable under ordinary conditions. Moreover, no attack on the material of the mold is observed under ordinary conditions as would be expected if such vapors are liberated.

EXAMPLES 37 – 39

Blends were prepared consisting of 35 parts of poly-(2,6-dimethyl-1,4-phenylene) ether (General Electric PPO having an intrinsic viscosity of 0.40 – 0.65 dl/g.) and 65 parts of high impact polystyrene (Lustrex HT 91), 1.5 parts of polyethylene, 7 parts triphenyl phosphate and 1.0 part tridecylphosphite. The listed stabilizers were added. The material was extruded into pellets (see Examples 16 to 24, page 14) and the pellets were compression molded into 10 mil film.

| Sample No. | Stabilizer added (phr) | Oxygen uptake time (10 ml $O_2$) at 110°C. |
|---|---|---|
| 37 | TDP (1.0) | 144 |
| 38 | TDP (1.0) ZnS (0.15) ZnO (0.15) | 384 |
| 39 | TDP (1.0) ZnS (0.15) ZnO (0.15) TEOA (0.15) | 640 |

EXAMPLES 40 – 42

Blends were prepared consisting of 50 parts of high impact polystyrene (Foster Grant 834) 50 parts of poly(2,6-dimethyl-1,4-phenylene) ether (General Electric PPO having an intrinsic viscosity of 0.40 – 0.65 dl/g.) and 1.5 parts of polyethylene. The listed stabilizers were added. The compositions were then blended and extruded by procedures similar to those used in Examples 1 to 8 on page 11. The pellets were molded into tensile bars (Examples 9 to 14) and aged to embrittlement at 115°C.

| Sample No. | Stabilizer | Days to Embrittlement at 115°C. |
|---|---|---|
| 40 | ZnS (0.15) TDP (1.0) | 42 |
| 41 | ZnS (0.15) ZnO (0.15) TDP (1.0) | 47 |
| 42 | ZnS (0.15) ZnO (0.15) TDP (1.0) TEOA (0.5) | 95 |

EXAMPLES 43 – 47

The following stabilized blends are prepared in a method analogous to the method of Examples 32 to 39.

| Sample No. | Stabilizer |
|---|---|
| 43 | ZnS (0.3) TEOA (0.5) $TiO_2$ (0.3) TDP (1.0) |
| 44 | ZnS (0.15) TDP (1.0) CdO (0.15) |
| 45 | ZnS (0.15) TEOA (0.15) BaO (0.15) TDP (1.0) |
| 46 | ZnS (0.15) TDP (1.0) ZnO (0.15) TEOA (0.15) |
| 47 | ZnS (0.25) TDP (1.25) CaO (0.25) TEOA (0.15) |

EXAMPLES 48 u 50

The following stabilized blends are prepared by a method analogous to that employed in Examples 40 – 42:

| Sample No. | Stabilizer |
|---|---|
| 48 | ZnS (0.15) |
|  | TDP (1.0) |
|  | CaO (0.15) |
|  | TEOA (0.15) |
| 49 | NiS (0.25) |
|  | TDP (1.25) |
|  | BaO (0.15) |
|  | TEOA (0.25) |
| 50 | CdS (0.15) |
|  | TDP (1.0) |
|  | ZnO (0.15) |

The compositions of Examples 37 – 50 which contain inorganic sulfide in combination with metal oxide show no tendency to liberate by-products even under aqueous acidic conditions. The metal oxides also enhance thermal aging in zinc-containing compositions.

Obviously, other modifications and variations of the present invention are possible in the light of the above teachings. It is, therefore, to be understood that changes may be made in the particular embodiments of the invention described which are within the full intended scope of the invention as defined by the appended claims.

What is claimed is:

1. A stabilized polymer composition comprising a major proportion of a polyphenylene ether of the formula:

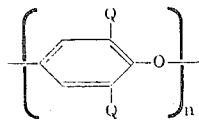

where the oxygen ether atom of one unit is connected to the benzene nucleus of the next adjoining unit, $n$ is a positive integer of at least 50, and each Q is a monovalent substituent selected from the group consisting of hydrogen, halogen, hydrocarbon radicals, halohydrocarbon radicals having at least two carbon atoms berween the halogen atom and the phenyl nucleus, hydrocarbonoxy radicals and halohydrocarbonoxy radicals having at least two carbon atoms between the halogen atom and phenyl nucleus and a stabilizing quantity in minor proportion of an alkanolamine of the formula $NR_3$ wherein each R is independently selected from the group consisting of hydrogen and (lower)alkanol, provided that at least two R's are alkanol in combination with a member selected from the group consisting of an inorganic sulfide, an organic phosphite and a mixture thereof.

2. A stabilized polymer composition as defined in claim 1 wherein the polyphenylene ether component is a poly(2,6-dialkyl-1,4-phenylene)ether.

3. A stabilized polymer composition as defined in claim 2 in admixture with a polystyrene resin.

4. A stabilized polymer composition as defined in claim 3 wherein said polystyrene resin is a high impact polystyrene resin.

5. A stabilized polymer composition as defined in claim 4 wherein said polyphenylene ether and the high impact polystyrene resin each constitute from about 30 to 70 parts by weight per 100 parts of polymer components.

6. A stabilized polymer composition as defined in claim 5 wherein said polyphenylene ether component is a poly(2,6-dialkyl-1,4-phenylene)ether.

7. A stabilized polymer as defined in claim 6 where the alkanolamine is of the formula $NR_3$ where each R is independently selected from the group of hydrogen and alkanol having from 1 to 4 carbon atoms provided that at least two of said Rs are alkanol.

8. A stabilized polymer composition as defined in claim 1 wherein said alkanolamine comprises from about 0.1 to 6.0 per cent by weight of the composition.

9. A stabilized polymer composition as defined in claim 1 wherein said stabilizer combination comprises said inorganic sulfide and said alkanolamine, each in an amount of from 0.1 to 6.0 percent by weight of the composition.

10. A stabilized polymer composition as defined in claim 9 which includes from about 0.05 percent to about 6 percent by weight of a metal oxide.

11. A stabilized polymer composition as defined in claim 10 wherein the metal oxide is zinc oxide.

12. A stabilized polymer composition as defined in claim 6 where the stabilizer combination comprises said organic phosphite and said alkanolamine, each in an amount of from 0.1 to 6.0 percent by weight of the total composition.

13. A stabilized polymer composition as defined in claim 6 wherein said stabilizer combination comprises the alkanolamine, the organic phosphite and the inorganic sulfide, each in an amount of from 0.1 to 2.0 percent by weight of the total composition.

14. A stabilized polymer composition as defined in claim 13 which includes from about 0.05 percent to about 6 percent by weight of a metal oxide.

15. A stabilized polymer composition as defined in claim 14 wherein the metal oxide is zinc oxide.

16. A stabilized polymer composition as defined in claim 6 wherein said alkanolamine is a trialkanolamine.

17. A stabilized polymer composition comprising from 30 to 70 parts by weight of a poly(2,6-dialkyl-1,4-phenylene) ether, from 30 to 70 parts by weight of a polystyrene resin and from 0.1 to 6.0 percent by weight of an alkanolamine in combination with a member selected from the group consisting of organic phosphites, inorganic sulfides and mixtures thereof each in an amount of from 0.1 to 6.0 percent by weight of the total composition.

18. A stabilized polymer composition as defined in claim 17 wherein said polyphenylene ether is a poly(2,6-dimethyl-1,4-phenylene)ether and the polystyrene resin is a high impact strength polystyrene.

19. A stabilized polymer composition as defined in claim 18 wherein said stabilizer is a mixture of alkanolamine and an organic phosphite, each in an amount of from 0.1 to 6.0 percent by weight of the composition.

20. A stabilized polymer composition as defined in claim 18 wherein said stabilizer is a mixture of the alkanolamine and inorganic sulfide, each in an amount of from 0.1 to 6.0 percent by weight of the composition.

21. A stabilized polymer composition comprising approximately equal portions of a poly(2,6-dimethyl-1,4-phenylene) ether and high impact polystyrene resin and a stabilizer comprising a suflide selected from the group consisting of zinc sulfide and cadmium sulfide, a trialkanolamine of the formula $NR_3$ wherein each R is independently alkanol having from 1 to 4 carbon atoms and an organic phosphite of the formula

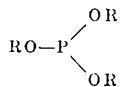

wherein R is independently hydrogen, alkyl of from 1-20 carbon atoms, alkenyl of from 1-20 carbon atoms, (lower)alkylphenyl, phenyl, haloalkyl of from 1-20 carbon atoms and phenyl substituted with at least one halogen, hydroxyl or (lower)alkyl groups, or a mixture thereof, each of said sulfide, phosphite and trialkanolamine comprising from 0.1 to 2.0 percent by weight of the composition.

22. A stabilized polymer as defined in claim 21 stabilized with a mixture of said cadmium or zinc sulfide, triethanolamine and tridecylphosphite.

23. A stabilized polymer composition comprising a polyphenylene ether of the formula:

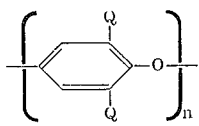

where the oxygen ether atom of one unit is connected to the bezene nucleus of the next adjoining unit, $n$ is a positive integer of at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus or a mixture of said polyphenylene ether with a polystyrene resin and an alkanolamine of the formula $NR_3$ where each R is independently selected from the group of hydrogen and alkanol having from 1 to 4 carbon atoms, provided that at least two of said Rs are alkanol said alkanolamine being in combination with an inorganic sulfide selected from sodium sulfide, potassium sufide, calcium sulfide, barium sulfide, zirconium sulfide, titanium sulfide, nickel sulfide, manganese sulfide, iron sulfide, cobalt sulfide, chromium sulfide, copper sulfide, zinc sulfide, cadmium sulfide, mercurous sulfide, mercuric sulfide, tin sulfide, and lead sulfide; an organic phosphite of the formula

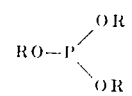

wherein R is independently hydrogen, alkyl of from 1-20 carbon atoms, alkenyl of from 1-20 carbon atoms, (lower)alkylphenyl, phenyl, haloalkyl of from 1-20 carbon atoms and phenyl substituted with at least one halogen, hydroxyl or (lower)alkyl groups, or a mixture thereof, the composition containing from 0.1 to 6.0 parts by weight of said alkanolamine and from 0.1 to 6.0 parts by weight of said organic phosphite, said inorganic sulfide, or said mixture thereof.

24. A stabilized polymer composition as defined in claim 23 wherein said trialkanolamine is in combination with cadmium sulfide or zinc sulfide.

25. A stabilized polymer composition as defined in claim 24 which also includes said organic phosphite.

26. A stabilized polymer composition as defined in claim 23 wherein said trialkanolamine is in combination with said inorganic sulfide and said composition also includes from about 0.05 percent to about 6 percent by weight of a metal oxide.

27. A stabilized polymer composition as defined in claim 26 wherein the metal oxide is titanium dioxide or zinc oxide.

28. A stabilized polymer composition as defined in claim 23 which also includes a polystyrene resin having at least 25% by weight polymer units derived from a monomer having the formula

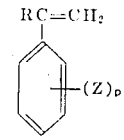

where R is hydrogen, (lower)alkyl or halogen; Z is a member selected from the class consisting of vinyl, hydrogen, halogen and (lower)alkyl; and $p$ is 0 or a whole number equal to from 1 to 5; said polyphenylene ether and said polystyrene resin each constituting from about 30 to 70 parts by weight per 100 parts of polymer components in said composition.

* * * * *

PO-1050
(5/69)

UNITED STATES PATENT OFFICE
CERTIFICATE OF CORRECTION

Patent No. 3,761,541      Dated September 25, 1973

Inventor(s) Arthur Katchman and Robert M. Summers

It is certified that error appears in the above-identified patent and that said Letters Patent are hereby corrected as shown below:

In Col. 5, line 30, right hand column heading should read: "Oxygen uptake time (hours at 125°C.)"; and, line 59, "120°C." should read -- 125°C. --; Col. 6, line 48, "1" should read -- 10 --; line 56 (in the third column heading), "120°C." should read -- 125°C. --; line 63 (in the second column), insert "TDP (1.0)", and (in the third column), "TDP (1.0)" should read -- 19 --; Column 7, line 8, after "bars" insert -- were --; line 15, after "at" insert -- 115°C. --; line 16, delete "115°C."; line 18 the "9" in the right hand margin should appear in the right hand data column; and Column 9, line 45, "ber-" should read -- bet- --.

Signed and sealed this 5th day of March 1974.

(SEAL)
Attest:

EDWARD M. FLETCHER, JR.
Attesting Officer

C. MARSHALL DANN
Commissioner of Patents